(12) United States Patent
Velasquez et al.

(10) Patent No.: US 8,556,248 B2
(45) Date of Patent: Oct. 15, 2013

(54) LENS HOLDERS FOR USE IN LENS COATING PROCESSES

(75) Inventors: Phillip Velasquez, Pico Rivera, CA (US); Hamlet Joe Avetisian, Sr., Pico Rivera, CA (US); Joey Dee Ochoa, Los Angeles, CA (US); Timothy George Stephan, Huntington Beach, CA (US); Arman Bernardi, Glendale, CA (US)

(73) Assignee: I-Coat Company, LLC, Santa Fe Springs, CA (US)

( * ) Notice: Subject to any disclaimer, the term of this patent is extended or adjusted under 35 U.S.C. 154(b) by 525 days.

(21) Appl. No.: 12/755,413

(22) Filed: Apr. 6, 2010

(65) Prior Publication Data

US 2010/0275839 A1 Nov. 4, 2010

Related U.S. Application Data

(60) Provisional application No. 61/167,471, filed on Apr. 7, 2009.

(51) Int. Cl.
*B25B 27/14* (2006.01)

(52) U.S. Cl.
USPC .......................................... 269/143; 269/249

(58) Field of Classification Search
USPC ............................ 269/134, 249, 246, 43, 45
See application file for complete search history.

(56) References Cited

U.S. PATENT DOCUMENTS

| | | | | |
|---|---|---|---|---|
| 3,172,158 A | * | 3/1965 | Herman et al. | 425/12 |
| 4,031,603 A | * | 6/1977 | Shultz | 29/426.6 |
| 4,389,912 A | * | 6/1983 | Dallons et al. | 81/320 |
| 8,266,774 B1 | * | 9/2012 | Doty | 29/253 |
| 2005/0208212 A1 | | 9/2005 | Jallouli et al. | |
| 2006/0202369 A1 | | 9/2006 | Foreman et al. | |
| 2006/0251316 A1 | | 11/2006 | Tucker et al. | |
| 2008/0035053 A1 | | 2/2008 | Muster et al. | |
| 2008/0051012 A1 | | 2/2008 | Akiyama et al. | |
| 2009/0255105 A1 | * | 10/2009 | Morin et al. | 29/426.1 |
| 2010/0275839 A1 | * | 11/2010 | Velasquez et al. | 118/503 |

OTHER PUBLICATIONS

International Search Report for International Application PCT/US2010/030151, report completed May 25, 2010, mailed Jun. 2, 2010, 2 pgs.
Written Opinion for International Application PCT/US2010/030151, report completed May 25, 2010, mailed Jun. 2, 2010, 6 pgs.

* cited by examiner

*Primary Examiner* — Lee D Wilson
(74) *Attorney, Agent, or Firm* — KPPB LLP

(57) ABSTRACT

Lens holders are disclosed that clasp the lens using rubberized paddles to reduce scratching and which include legs that are shaped to enable visual inspection of a lens without removal of the lens from the lens holder. One embodiment includes a lens holder body including a clip and a leg, and a spring fixed to the lens holder body. In addition, the leg includes a ledge, the spring includes two flexible arms terminating in paddles, the paddles are configured to clasp a lens resting on the ledge, at least the portion of each of the paddles that contact a lens clasped by the paddles is constructed from a resilient non-abrasive material, and the leg is formed so that a lens clasped by the springs and resting on the leg can be visually inspected without removing the lens from the lens holder.

15 Claims, 4 Drawing Sheets

LENS HOLDERS FOR USE IN LENS COATING PROCESSES

RELATED APPLICATION

The present application claims priority to U.S. Provisional Application No. 61/167,471 to Velasquez et al. entitled "Lens Holder for Use in Lens Coating Processes" filed Apr. 7, 2009, the disclosure of which is incorporated herein by reference in its entirety.

FIELD OF THE INVENTION

The present invention relates generally to processes for chemically treating lenses and more specifically to lens holders for use during the dipping of lenses in chemical baths.

BACKGROUND

The production of prescription eye glasses typically involves the grinding of lenses in accordance with the prescription and the coating of the lenses with one or more chemical coatings including, but not limited to, scratch resistant hard coatings and anti-reflective coatings. Once the coatings have been applied, the lenses can be cut to fit a specific frame shape.

Lens suppliers typically ship lenses with hard coatings. The grinding of lenses removes the hard coating from the ground surface(s) of the lenses. When applying coatings to the ground lenses, the best results are typically achieved by removing any remaining hard coating prior to the application of the new coatings. Although in some instances overcoating is sufficient or the lens does not include a hard coat, and stripping may not be necessary. Where stripping is required, the removal of the hard coat can be achieved by dipping the lenses into baths of chemicals that strip the hard coating from the lenses.

When stripping or coating lenses, dip line manufacturing equipment can be used to perform the dipping of lenses into the appropriate baths of chemicals. The lenses are typically mounted onto lens holders that attach to the dip line manufacturing equipment, which dips the lenses into the baths of chemicals. A typical lens holder is illustrated in FIGS. 1a and 1b. The lens holder 10 includes a body 12 including a clip 14, which is used to suspend the lens holder from a cross bar, and a leg 16 from which a stepped ledge 18 extends. A spring 20 is attached to the body 12 by a rivet 22. The spring includes two flexible arms that extend from the rivet to a pair of paddles 24. In order to more securely hold a lens, the stepped ledge 18 includes steps 26 that form a depression in the ledge in which the lens can rest. Similarly, the contacting surface 28 of each of the paddles is concave. The contacting surface is typically the edge of a piece of metal, which can be sharp and/or abrasive and scratch a lens. A lens mounted within the lens holder shown in FIGS. 1a and 1b is illustrated in FIG. 2. As can be seen from FIG. 2, the spring 20 flexes to accommodate the lens between the paddles 24 and the lens rests against the steps of the stepped ledge 18 and is cradled between the contacting surfaces 28 of the paddles.

When coating materials are distributed unevenly or show imperfections such as drips, bubbles, pits, etc. on a lens, which can occur due to a variety of reasons including a drip of coating material on the surface of the lens or a bubble of coating material forming between the lens and the lens holder and then bursting, the lens must be stripped of the coating material and recoated resulting in a delay in the completion of the prescription eye glasses. When a lens is scratched during the coating process, the lens is typically discarded and a replacement lens is ground resulting in a delay in delivery and an increase in cost.

SUMMARY OF THE INVENTION

Use of lens holders in accordance with embodiments of the invention during the removal of hard coating from lenses and during the application of coatings to lenses can significantly decrease the number of lenses that are scratched and must be discarded during manufacture. In many instances, scratches are avoided due to the ability to visually inspect lenses without removing them from the lens holder. In addition, use of the lens holders can significantly decrease the number of lenses that must be stripped and recoated due to imperfections in coatings resulting from drips, bubbles, pits, etc. on the surfaces of the lenses. In many embodiments, the lens holders include a body that is offset relative to the edge of a lens mounted within the lens holder. In several embodiments, the lens holders include rubberized paddles.

One embodiment includes a lens holder body including a clip and a leg, and a spring fixed to the lens holder body. In addition, the leg includes a ledge, the spring includes two flexible arms terminating in paddles, the paddles are configured to clasp a lens resting on the ledge, at least the portion of each of the paddles that contact a lens clasped by the paddles is constructed from a resilient non-abrasive material, and the leg is formed so that a lens clasped by the springs and resting on the leg can be visually inspected without removing the lens from the lens holder.

In a further embodiment, the resilient non-abrasive material is a rubber material.

In another embodiment, the rubber is molded over a metal paddle.

In a still further embodiment, the surface of the paddles configured to clasp a lens are flat.

In still another embodiment, the surface of the paddles configured to clasp a lens are concave.

In a yet further embodiment, the ledge is stepped.

In yet another embodiment, the spring is riveted to the body of the lens holder.

In a further embodiment again, the spring includes registration features.

In another embodiment again, the body includes a counterweight configured to provide the lens holder body with an even weight distribution.

In a further additional embodiment, the clip is configured to secure the lens holder to dip line manufacturing equipment.

In another additional embodiment, the leg is rectangular.

In a still yet further embodiment, the leg is circular.

In still yet another embodiment, the leg describes a shape that contains the arm of the spring closest to the leg when the spring clasps a lens.

In a still further embodiment again, the leg is offset relative to the edge of a lens mounted in the lens holder.

Still another embodiment again includes a lens holder body including a clip configured to secure the lens holder to dip line manufacturing equipment, and a leg including at least one ledge on which a lens can rest, and a spring fixed to the lens holder body, where the spring includes two flexible arms terminating in paddles configured to clasp a lens and at least partially constructed from a resilient non-abrasive material.

A still further additional embodiment, includes a spring including a portion configured to be attached to a lens holder and two arms terminating in paddles, where the paddles are formed at least in part from a resilient non-abrasive material and the paddles are configured to clasp a lens.

In still another additional embodiment, the resilient non-abrasive material is rubber.

In a yet further embodiment again, the rubber is molded over metal paddles.

In yet another embodiment again, the arms of the spring include registration features configured to align the metal padels during the molding of the rubber over the metal padels.

Another further embodiment includes a lens holder body including a clip and a leg, and a spring fixed to the lens holder body. In addition, the spring includes two flexible arms terminating in paddles, the leg includes a ledge, the paddles are configured to clasp a lens resting on the ledge of the lens, the ledge is stepped, at least the portion of each of the paddles that contact a lens clasped by the paddles is constructed from a resilient non-abrasive material, the resilient non-abrasive material is a rubber material, the leg is formed so that a lens clasped by the springs and resting on the leg can be visually inspected without removing the lens from the lens holder, and the shape of the leg is such that the leg is offset relative to the edge of a lens, when a lens is mounted in the lens holder.

DETAILED DESCRIPTION OF THE INVENTION

Turning now to the drawings, lens holders in accordance with embodiments of the invention are shown. The lens holders include bodies, which are offset relative to the edges of a lens mounted in the lens holder, and rubberized paddles mounted on springs that clasp lenses resting on one or more ledges supported by the bodies of the lens holders. In several embodiments, offsetting the body of the lens holder, specifically a leg supporting a ledge on which a lens can rest, relative to the edge of a lens mounted within the lens holder enables visual inspection of the lens without the removal of the lens from the lens holder. The ability to visually inspect lenses without removal of the lens from the lens holder reduces the incidence of scratching due to handling. The offset of the body relative to the edge of the lens also decreases the likelihood of contact between the body and the lens or the paddles of the lens holder, which can result in drips, bubbles, pits, etc. that mar the lens coating. In a number of embodiments, use of rubberized paddles reduces scratching resulting from contact between the lens and the paddles. As is discussed further below, a variety of paddle configurations can be utilized in accordance with embodiments of the invention to clasp without scratching.

Figure 3A:
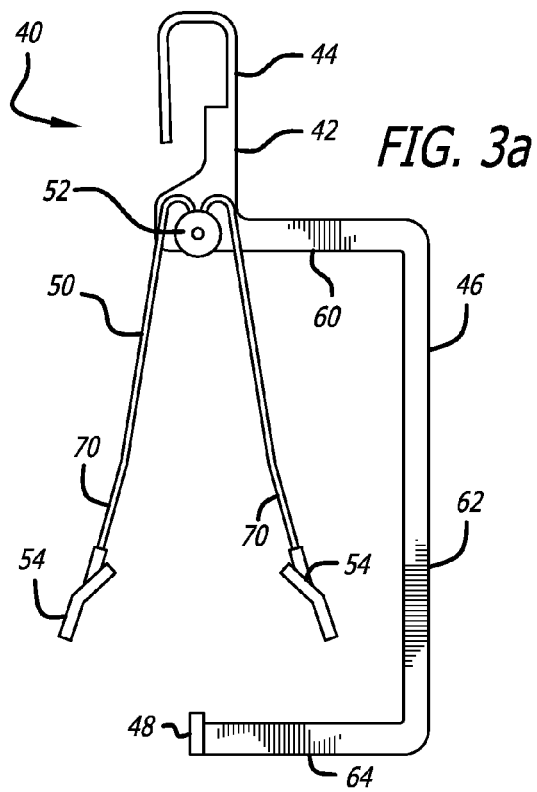
FIGS. 3a and 3b are views of a lens holder in accordance with an embodiment of the invention.
Figure 3B:
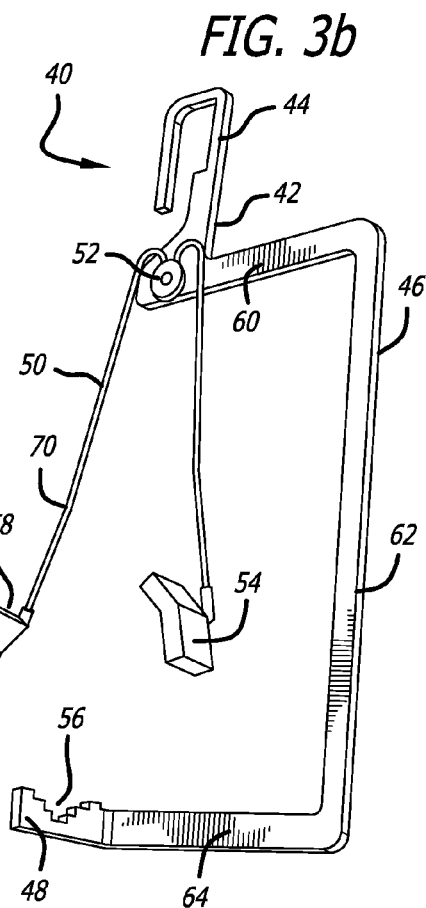

A lens holder including a body having a rectangular leg in accordance with an embodiment of the invention is shown in FIGS. 3a and 3b. The lens holder 40 includes a body 42 having a clip 44 for securing the lens holder to dip line manufacturing equipment, and a rectangular leg 46. In the illustrated embodiment, the rectangular leg 46 is bent to form a ledge 48 that extends in a direction perpendicular to the plane of the rectangular portion of the leg. A spring 50 is fixed to the body by a rivet 52. The spring includes two arms that extend from the body of the lens holder and that terminate in rubberized paddles 54 that are at least partially formed from or coated in a resilient non-abrasive material, including but not limited to a suitable rubber material. The contacting surface 58 of the rubberized paddles is shaped to grip a lens and the ledge 48 can include steps 56 or one or more shoulders to form a depression in which a lens can rest. In a number of embodiments, the contact surface 58 is a flat surface. In many embodiments, the contacting surface 58 can be a concave surface.

The leg 46 of the lens holder illustrated in FIGS. 3a and 3b is described as rectangular, because it includes a first transverse section 60, a longitudinal section 62, and a second transverse section 64 that generally describe three edges of a rectangle. As can be seen in the illustrated embodiment, the shape of the rectangular leg 46 is such that the longitudinal section 62 of the leg is offset relative to the stepped ledge 48. Offsetting the longitudinal section of the leg can provide a number of benefits in terms of facilitating the visual inspection of a lens held in the lens holder and in reducing the incidence of drips and bubble formation.

The ledge 48 shown in FIGS. 3a and 3b is formed by bending the body of the lens holder during manufacture. Creating the ledge in this way can result in a ledge that is more stable than ledges formed from a separate piece mounted to the leg of the lens holder. Although the stepped ledge shown in FIGS. 3a and 3b is formed by bending the body of the lens holder, a stepped ledge in accordance with embodiments of the invention can be formed using an additional piece and/or using any other appropriate manufacturing process.

The spring shown in FIGS. 3a and 3b includes rubberized paddles that are rubberized in such a way that the contact surface is configured to clasp a lens and is resilient and non-abrasive. As is discussed further below, the rubberized paddles perform the function of clasping the edges of a lens mounted within the lens holder. In many embodiments, the rubber provides increased grip compared to traditional metal paddles and also serves as a shock absorber decreasing the likelihood that the lens will shake loose from the lens holder. In a number of embodiments, the paddles are rubberized by molding rubber around metal paddles welded to the ends of the spring. The metal paddles provide structural integrity to the rubber that coats the metal paddles. The placement of the metal paddles within the molds is important for ensuring that a sufficient thickness of rubber is formed around the contact surface of the rubberized paddles. When the metal paddles extend through the rubber at the contact surface, the sharp and/or abrasive edges of the metal paddles can scratch the surface of the lens. Springs in accordance with embodiments of the invention are constructed including registration features 70 that aid in the alignment of the paddles with respect to the molds used to rubberize the paddles. In the illustrated embodiment, the registration features are bends in the spring that can be used to align the spring with respect to a mold. Molding is not the only process that can be used to rubberize the paddles. However, the process of forming the rubberized paddles can be important. Reservoirs within the rubber can result in drips and deterioration of the rubber can result in contamination and/or clogging of filters of the chemical baths in which the lens holders are immersed. In many embodiments, the rubber used to rubberize the paddles has chemical resistance to the acids and bases used in the specific application, has heat resistance appropriate to the application, and shrinkage and expansion durability. In addition, the rubber is sufficiently soft as to not scratch the lens and sufficiently hard as to provide a reliable grip. In several embodiments, a rubber similar to Compound No. 97011 provided by Sante Fe Rubber of Whittier, Calif. having a durometer hardness of 70+/−5, and a tensile strength of at least 2000 PSI is used in the construction of the rubberized paddles. In other embodiments, other rubbers appropriate to a specific application can be used including but not limited to rubbers having significantly different durometer and strengths. Although rubberized paddles are shown in FIGS. 3a and 3b, paddles constructed from any of a variety of resilient non-abrasive materials appropriate for use in chemical baths in which the lens holder is to be dipped during stripping, cleaning, etching and/or coating can be used in accordance with embodiments of the invention. Furthermore, although the spring is shown as being fixed to the body of the lens holder by a rivet, any appropriate technique can be used to secure a spring to a lens holder in accordance with embodiments of the invention.

Figure 1A:
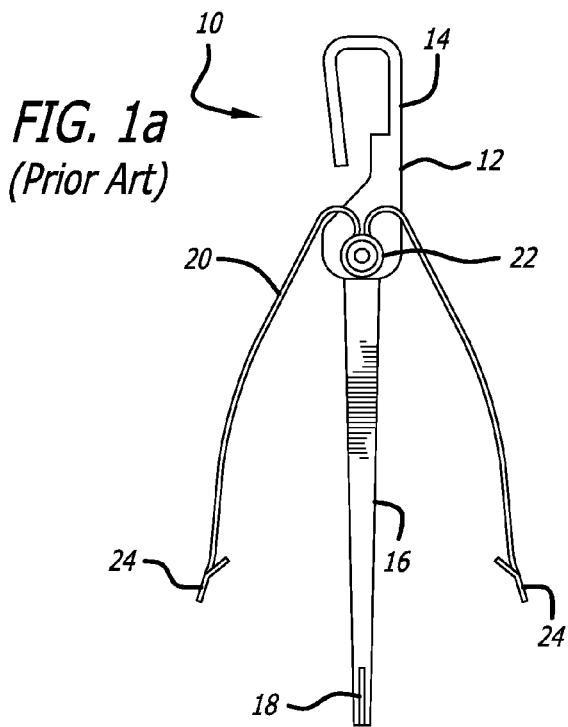
FIGS. 1a and 1b are views of a prior art lens holder.
Figure 1B:
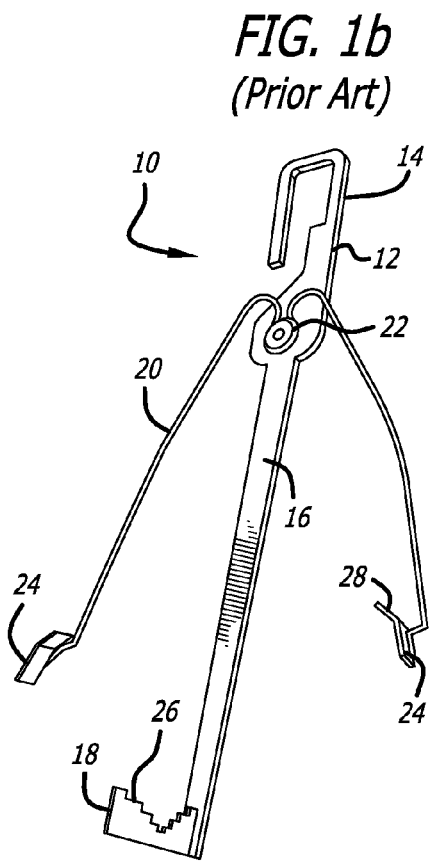
Figure 2:
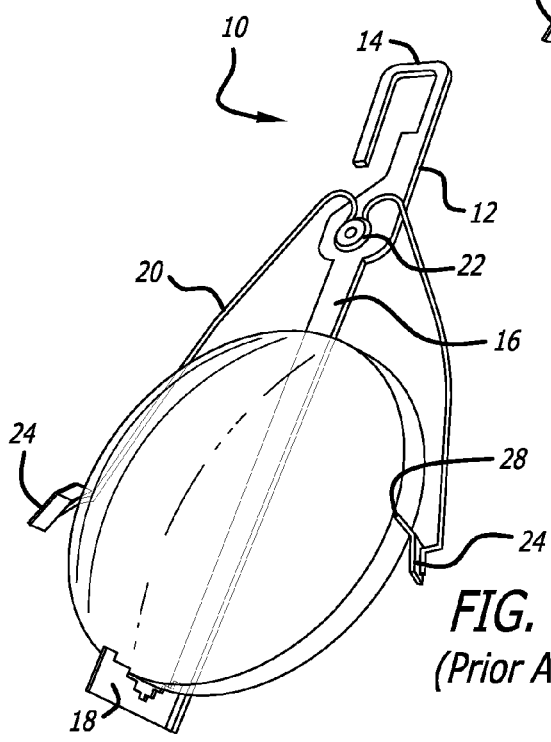
FIG. 2 is a view of the prior art lens holder shown in FIGS. 1a and 1b in which a lens is mounted.
Figure 4:
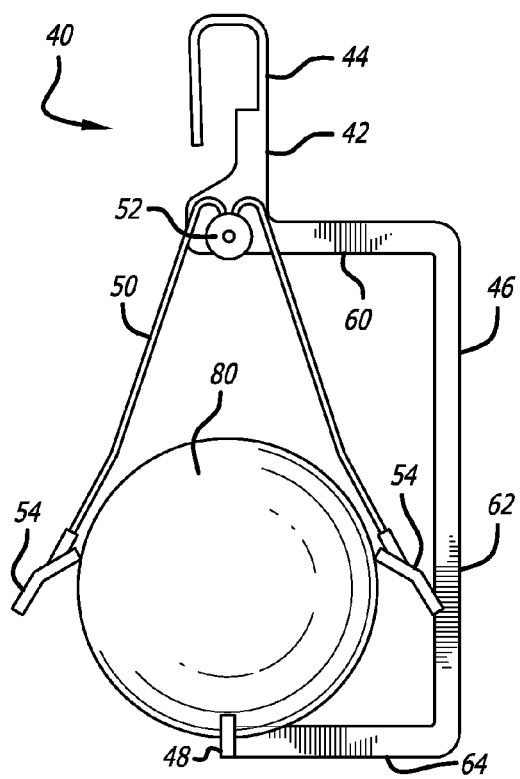
FIG. 4 is a view of the lens holder shown in FIGS. 3a and 3b in which a lens is mounted.

The lens holder shown in FIGS. 3a and 3b is shown holding a lens in FIG. 4. The lens 80 rests on the ledge 48 and is clasped between the contacting surfaces of the rubberized paddles 54. The offset of the longitudinal section 62 of the rectangular leg 46 from the stepped ledge 48 enables a complete visual inspection of the lens without removal of the lens from the lens holder. When the leg of the lens lines up with the middle of a lens held in the lens holder, such as the design shown in FIGS. 1a and 1b, visual inspection of the lens can be difficult without removal of the lens from the lens holder. Offsetting the leg of the lens holder so that the lens can be visually inspected without removal of the lens can increase production yields by reducing the number of lenses that are scratched during removal and replacement of the lenses.

Displacing the leg of a lens holder in accordance with embodiments of the invention so that the leg is offset relative to the edge of a lens mounted in the lens holder can provide benefits beyond facilitating visual inspection of the lens. Providing an offset between the leg and the lens reduces the likelihood that the leg and the lens will contact, which can result in the formation of a drip. Furthermore, offsetting the leg relative to the paddles of the lens holder can reduce the likelihood of bubble formation. When the paddles or an edge of the lens touches the leg of the lens holder, a bubble of coating material can form as the lens holder is removed from a chemical bath. Bursting of the bubble can result in splashes of coating material striking the lens, necessitating the stripping and recoating of the lens. Therefore, offsetting the leg of the lens holder can provide numerous benefits. Although a rectangular leg is shown, any of a variety of leg shapes can be utilized in the construction of a lens holder in accordance with embodiments of the invention that involve the leg being offset relative to the edge of the lens.

In several embodiments, the shape of the leg used to result in an offset of the leg relative to the edge of a lens mounted within the lens holder provides the lens holder with an uneven weight distribution. The uneven weight distribution can be readily compensated for by incorporating a counterweight into the body of the lens holder as appropriate.

In the embodiment illustrated in FIG. 4, offset between the lens 80 and the leg of the lens holder is increased by resting the lens on a stepped ledge 48 that extends out perpendicularly from the plane of the leg. A ledge can also be formed above the leg so that the lens rests in the plane of the leg. When the lens is mounted in this fashion, raising the ledge relative to the leg of the lens holder can increase the distance from the lower edge of the lens to the leg of the lens holder. As can be readily appreciated, a variety of configurations in accordance with embodiments of the invention can be used to increase the offset between the leg and the edge of a lens mounted in the lens holder. In many embodiments, the shape of the lens is configured to prevent contact between the leg and/or paddles due to twisting of a lens held by the lens holder.

Figure 5:
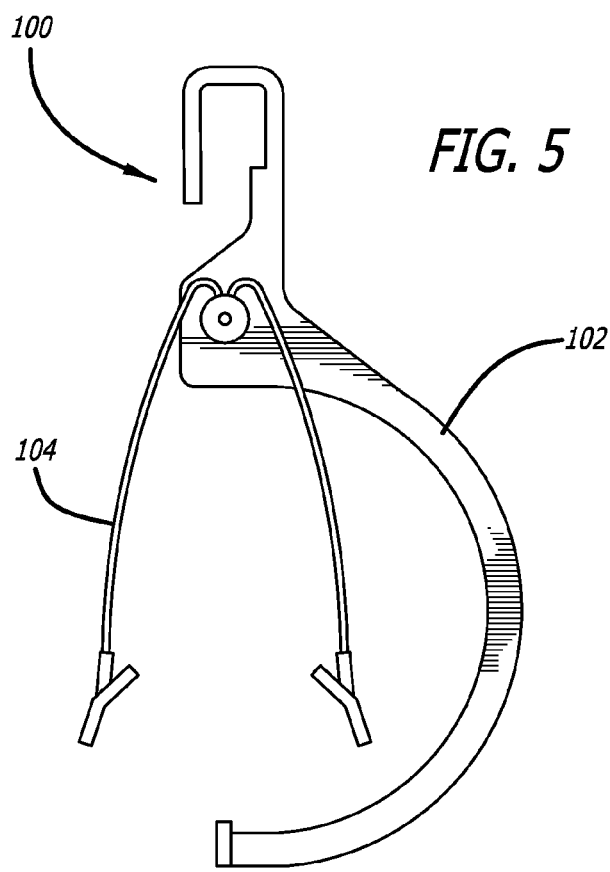
FIG. 5 is a view of a lens holder including a curved leg in accordance with an embodiment of the invention.
Figure 6:
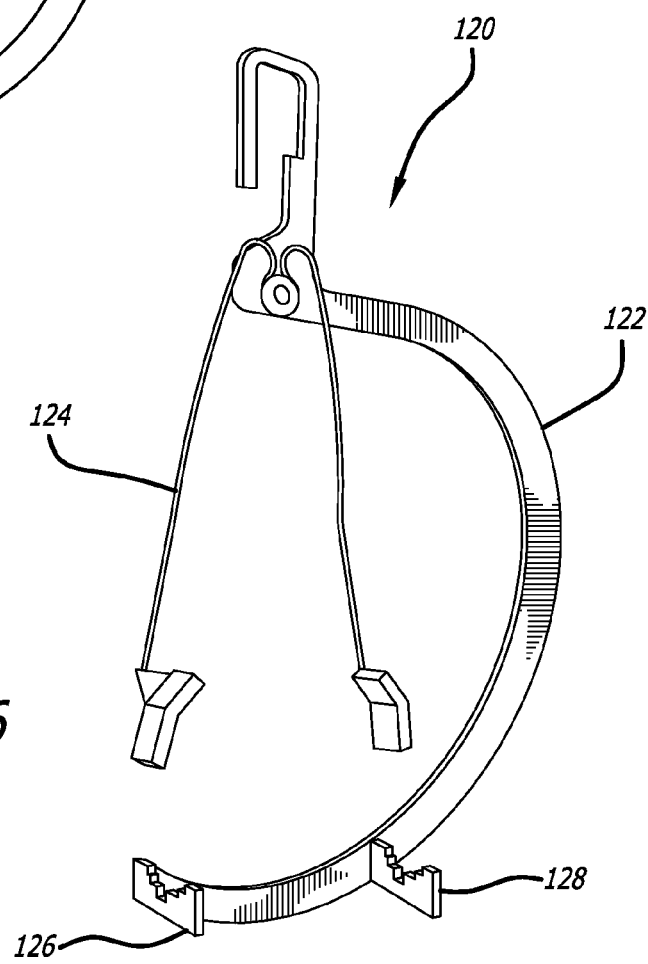
FIG. 6 is a view of a lens holder including a curved leg and two stepped ledges in accordance with an embodiment of the invention.

As noted above, a lens holder in accordance with an embodiment of the invention can include a leg shape other than a rectangular leg shape. Lens holders in accordance with embodiments of the invention that include legs that are circular in shape are illustrated in FIGS. 5 and 6. The lens holder 100 illustrated in FIG. 5 includes a circular leg that is shaped so that the leg does not obstruct the lens and so that the springs 104 are unlikely to touch the leg when the springs clasp a lens. The lens holder 120 shown in FIG. 6 is similar to the lens holder 100 shown in FIG. 5 in that it includes a circular leg 122 and a spring 124 to clasp a lens. However, the lens holder 120 includes both a first ledge 126 and a second ledge 128 to provide additional stability to a lens held in the lens holder. As with the lens holder illustrated in FIGS. 3a-4, the lens holder 100 illustrated in FIG. 5 and the lens holder 120 illustrated in FIG. 6 reduce the likelihood of drip formation and eliminate the need to remove the lens from the lens holder in order to perform visual inspection of the lens.

Although rectangular and circular legs are discussed above, embodiments of the invention can utilize other shaped legs appropriate to a specific application that allow for visual inspection and reduce the likelihood that the springs or the lens will touch the leg during use. In addition, multiple ledges can be utilized on any shaped leg in accordance with embodiments of the invention.

Figure 7:
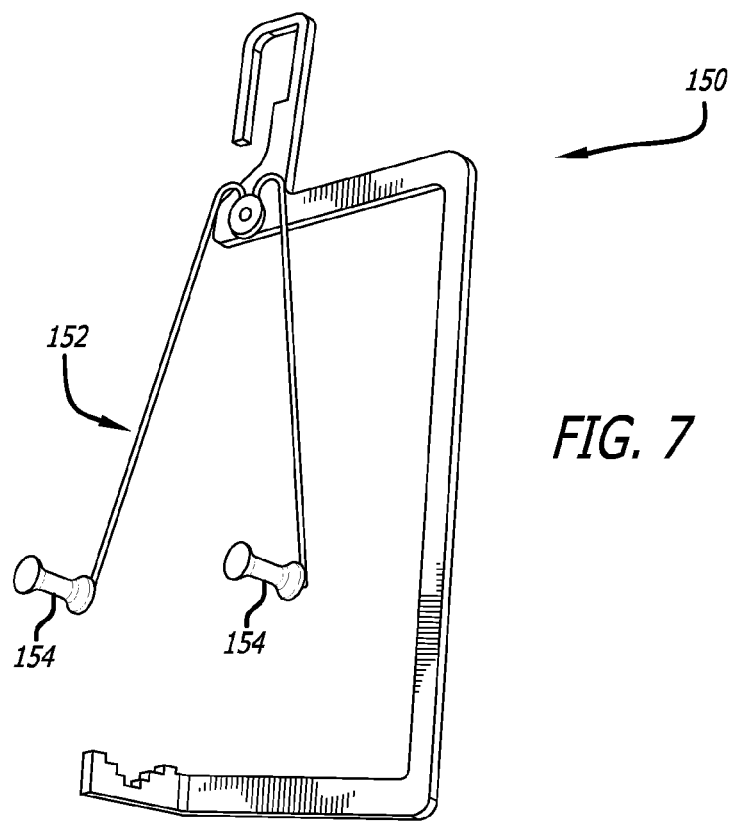
FIG. 7 is a view of a lens holder including an alternative paddle construction in accordance with an embodiment of the invention.
Figure 8:
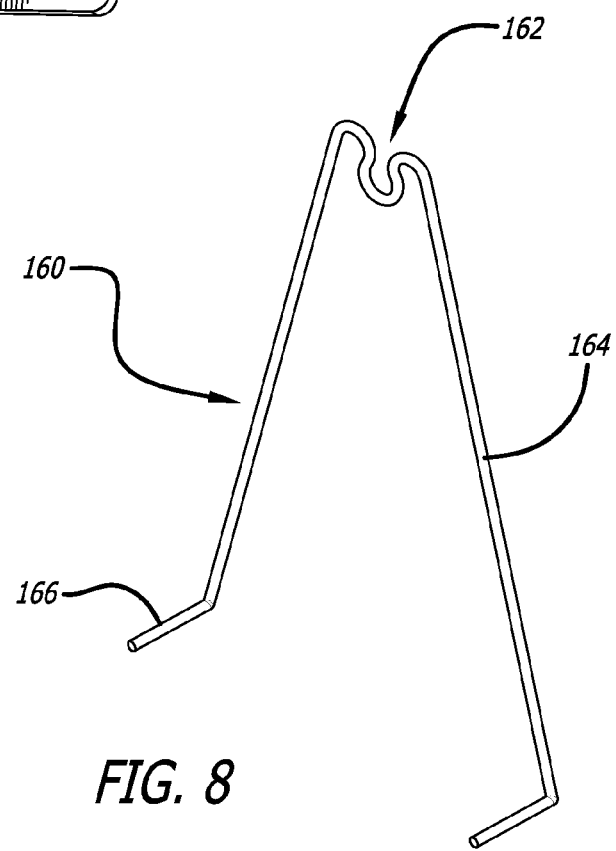
FIG. 8 is a view of a spring in accordance with an embodiment of the invention that is similar to the spring utilized in the lens holder illustrated in FIG. 7.

As is noted above, the use of rubberized paddles can significantly reduce scratching of lenses. A lens holder in accordance with an embodiment of the invention that utilizes an alternative rubber paddle configuration in accordance with an embodiment of the invention is illustrated in FIG. 7. The lens holder 150 includes a spring 152 on which two rubber paddle tips 154 are mounted. In the illustrated embodiment, the rubber paddle tips include shoulders at each end that help secure a lens clasped by the contact surfaces of the rubber paddle tips. In many embodiments, the rubber paddle tips can be cylindrical or any other shape that is suitable for clasping a lens. A spring 160 that can be used in the construction of the lens holder 150 shown in FIG. 7 is illustrated in FIG. 8. The spring 160 includes a portion 162 bent into a configuration that enables the spring to be riveted or otherwise fixed to the body of a lens holder, two arms 164, and two tips 166 that extend perpendicularly from the arms. Rubber paddle tips can be formed over the spring tips by molding or by forcing the spring tips through pre-formed rubber. Although specific rubber paddle configurations and processes for forming rubberized panels are disclosed above, other shapes, materials and/or processes can be used to create paddles formed at least partially from resilient non-abrasive materials that are configured to clasp a lens and protect the lens from scratching in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A lens holder, comprising:
   a lens holder body including a clip and a leg for holding a lens having front and back faces circumscribed by a perimeter edge; and
   a spring fixed to the lens holder body;
   wherein the leg includes a ledge upon which a portion of the perimeter edge of the lens rests;
   wherein the spring includes two flexible arms terminating in paddles;
   wherein the paddles are configured to clasp a lens resting on the ledge;
   wherein at least the portion of each of the paddles that contact a portion of the perimeter edge of the lens clasped by the paddles is constructed from a resilient non-abrasive material; and
   wherein the leg is formed so that it is offset relative to the perimeter edge of the lens such that no portion of the leg passes in front or behind either of the faces of the lens such that a lens clasped by the springs and resting on the leg can be visually inspected without removing the lens from the lens holder.

2. The lens holder of claim 1, wherein the resilient non-abrasive material is a rubber material.

3. The lens holder of claim 2, wherein the rubber is molded over a metal paddle.

4. The lens holder of claim 1, wherein the surface of the paddles configured to clasp a lens are flat.

5. The lens holder of claim 1, wherein the surface of the paddles configured to clasp a lens are concave.

6. The lens holder of claim 1, wherein the ledge is stepped.

7. The lens holder of claim 1, wherein the spring is rivitted to the body of the lens holder.

8. The lens holder of claim 1, wherein the spring includes registration features.

9. The lens holder of claim 1, wherein the body includes a counterweight configured to provide the lens holder body with an even weight distribution.

10. The lens holder of claim 1, wherein the clip is configured to secure the lens holder to dip line manufacturing equipment.

11. The lens holder of claim 1, wherein the leg is rectangular.

12. The lens holder of claim 1, wherein the leg is circular.

13. The lens holder of claim 1, wherein the leg describes a shape that contains the arm of the spring closest to the leg when the spring clasps a lens.

14. The lens holder of claim 1, wherein the leg is rectangular and bent so that the ledge extends in a direction perpendicular to the axis of the rectangular portion of the leg.

15. A lens holder, comprising:
   a lens holder body including a clip and a leg for holding a lens having front and back faces circumscribed by a perimeter edge; and
   a spring fixed to the lens holder body;
   wherein the leg includes a ledge upon which a portion of the perimeter edge of the lens rests;
   wherein the spring includes two flexible arms terminating in paddles;
   wherein the paddles are configured to clasp a lens resting on the ledge;
   wherein at least the portion of each of the paddles that contact a portion of the perimeter edge of the lens clasped by the paddles is constructed from a resilient non-abrasive material; and
   wherein the leg is formed so that it is offset relative to the perimeter edge of the lens such that no portion of the leg passes in front or behind either of the faces of the lens such that a lens clasped by the springs and resting on the leg can be visually inspected without removing the lens from the lens holder; and wherein the shape of the leg is rectangular and bent so that the ledge extends in a direction perpendicular to the axis of the rectangular portion of the leg.

* * * * *